United States Patent
Carter et al.

(10) Patent No.: US 7,039,205 B1
(45) Date of Patent: May 2, 2006

(54) TECHNIQUES FOR AUDIO TRANSDUCER SWITCHING UNDER PROGRAMMATIC AND OFF HOOK INTERRUPT CONTROL

(75) Inventors: George E. Carter, Santa Clara, CA (US); Katrina Chiang, Union City, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 0 days.

(21) Appl. No.: 09/314,615

(22) Filed: May 19, 1999

(51) Int. Cl.
*H02B 1/00* (2006.01)

(52) U.S. Cl. .................. 381/123; 381/58; 379/93.11

(58) Field of Classification Search ............ 379/88.23, 379/93.09, 93.11, 100.12, 100.15, 88.18, 379/67.1, 68, 93.05, 388.01, 388.02, 93.07; 381/123, 357, 182
See application file for complete search history.

(56) References Cited

U.S. PATENT DOCUMENTS

| | | | |
|---|---|---|---|
| 3,925,814 A | 12/1975 | Chernowitz | 360/2 |
| 5,111,500 A | 5/1992 | Afshar et al. | 379/67 |
| 5,363,434 A * | 11/1994 | Farinelli et al. | 379/170 |
| 5,400,393 A * | 3/1995 | Knuth et al. | 379/88.27 |
| RE34,968 E | 6/1995 | Afshar et al. | 379/67 |
| 5,515,423 A * | 5/1996 | Beck et al. | 379/100.12 |
| 5,625,697 A | 4/1997 | Bowen et al. | 381/92 |
| 5,673,327 A | 9/1997 | Julstrom | 381/119 |
| 5,710,821 A | 1/1998 | Cheah | 381/90 |
| 5,815,553 A | 9/1998 | Baugh et al. | 379/88 |
| 5,822,406 A * | 10/1998 | Brown | 379/88.07 |
| 6,049,605 A * | 4/2000 | Rizzo | 379/140 |

* cited by examiner

*Primary Examiner*—Fan Tsang
*Assistant Examiner*—Simon Sing

(57) ABSTRACT

Techniques for configuring multiple audio transducers, including telephony devices, are provided. Audio configurations for the multiple audio input and output transducers can be selected by the user. When it is determined that a telephony device has gone off hook, the audio configuration is changed to utilize the off hook telephony device. When the telephony device goes on hook, the audio configuration can be returned to its original state. The present invention allows multiple audio input and output transducers to be used, for example, in a computer telephony client by efficiently switching between these transducers via configuration changes. According to specific embodiments, the present invention may be provided in an audio transducer switch between the multiple audio transducers and a sound card of a computer, or within a sound card itself.

7 Claims, 9 Drawing Sheets

TECHNIQUES FOR AUDIO TRANSDUCER SWITCHING UNDER PROGRAMMATIC AND OFF HOOK INTERRUPT CONTROL

BACKGROUND OF THE INVENTION

The present invention relates to audio systems. More particularly, the invention relates to audio devices (e.g., sound cards) that allow multiple audio transducers to be efficiently configured in a computer system.

The early computer systems were technological marvels of their time, but practical applications for them were quite limited. As computer systems continue to evolve, the raw processing power and functionality they provide continue to increase.

As technology advances, computer systems are being integrated into telephone systems. This is especially true for next generation telephone systems that include packet switched transport in addition to the traditional circuit switched transport.

Incorporating personal computer clients in the next generation telephone systems will increase the number of audio transducers that can be used and further complicates the switching requirements. For example, it may be desirable to have a computer system provide communication through multiple microphones, multiple speakers, and multiple telephones.

Conventional systems will likely not efficiently provide this functionality. Conventional sound cards typically only have a few ports for connecting audio transducers such as microphones, speakers, headsets, and the like. The user may utilize an almost infinite number of audio transducers by manually disconnecting and connecting the different audio transducers. However, the requirement of manually connecting an audio transducer when it is desired is very tedious and too error prone to be practical. This problem is exacerbated by the fact that the ports to a sound card are typically at the back of the computer system and difficult to access.

Another solution can be to utilize a mechanical switch box to which the user connects multiple audio transducers to the sound card of the computer. Although the mechanical switch boxes may be placed in a more convenient location, it may be necessary to have multiple switch boxes (e.g., one switch box for input audio transducers and one for output audio transducers), which further complicates the task of switching audio configurations. Furthermore, this solution still requires a user to manually switch to the desired audio transducers.

Multiple sound cards can also be inserted into a computer system so that it would be possible to simultaneously connect multiple audio transducers. Application software could allow a user to switch between the different sound cards. There are a number of disadvantages with this solution including the utilization of scarce computer resources like slots, hardware interrupt requests (IRQs) and port addresses. Also, the number of sound cards that are designed to operate in a computer system with other sound cards is limited so the selection of sound cards that can be utilized may be reduced. Furthermore, as more audio transducers are added, there is a substantial incremental cost as new sound cards must be added.

Accordingly, what is needed are innovative techniques for efficiently configuring and using multiple audio transducers in computer systems. Additionally, it would be beneficial to provide automatic configuration for telephony devices that have off hook capabilities.

SUMMARY OF THE INVENTION

The present invention provides innovative techniques for configuring and utilizing multiple audio transducers, including telephony devices, in computer systems. According to a specific embodiment, an audio transducer switch can provide communication between the multiple audio input and output transducers and the sound card of a computer. A user can select the desired configuration of the audio transducers through a graphical user interface (GUI), which is then sent to the audio transducer switch via an interface such as a serial port. When the audio transducer switch detects that a telephony device has become off hook, the audio transducer switch can reconfigure itself to utilize the off hook telephony device. Once the telephony device is on hook or hung up, the audio transducer switch can revert back to its original configuration. Additionally, a user can be allowed to set default configurations and override default or current configurations in a GUI.

In accordance with other embodiments, a single sound card incorporating the invention can be used regardless of the number of audio transducers, which can drastically reduce hardware costs. Also, since a single sound card is utilized, the user can select a wide assortment of sound cards. In some embodiments, the sound card is internal to the computer system; while in alternate embodiments, the sound card is external to the computer system.

Other features and advantages of these and other embodiments of the invention will discussed in the following description in association with the accompanying drawings.

DETAILED DESCRIPTION OF EMBODIMENTS

In the description that follows, the present invention will be described in reference to embodiments that configure multiple audio transducers, including telephony devices. More specifically, the embodiments will be described in reference to sound card implementations that configure the multiple audio transducers for use with a computer system. However, the invention is not necessarily limited to the specific audio devices, implementations or architecture described herein as the invention can be implemented in different ways. Therefore, the description of the embodiments that follows is for purposes of illustration and not limitation.

Figure 1:
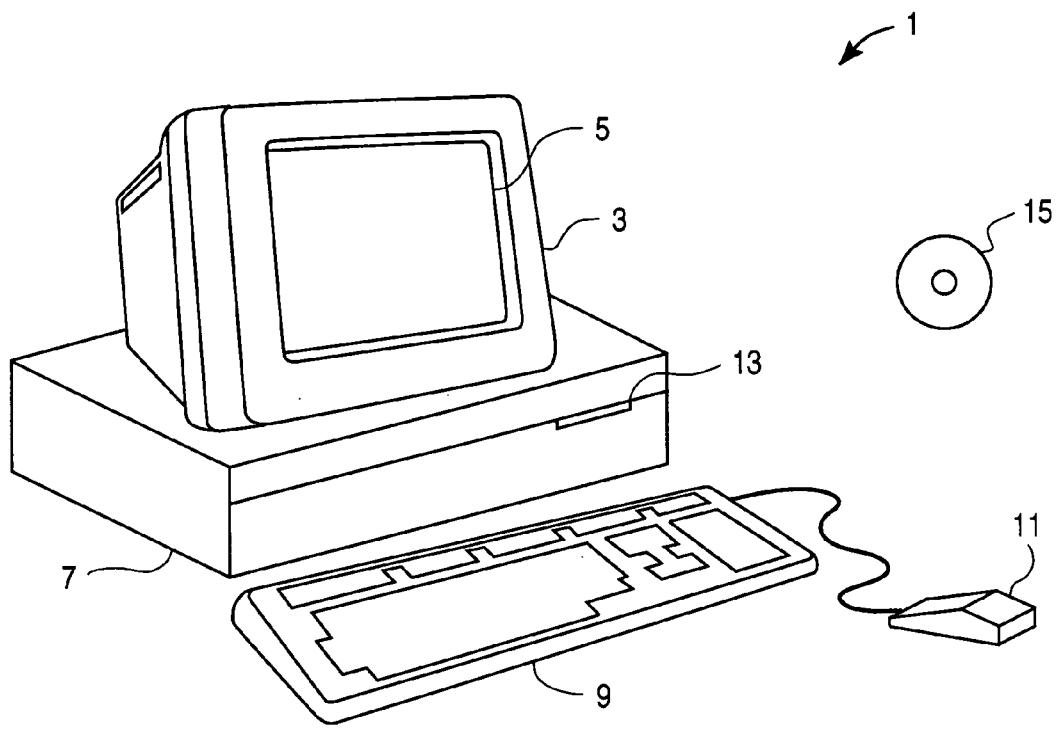
FIG. 1 illustrates an example of a computer system that can be utilized to execute the software of an embodiment of the invention and use hardware embodiments.

FIG. 1 illustrates an example of a computer system that can be used to execute the software of an embodiment of the invention and use hardware embodiments. FIG. 1 shows a computer system 1 that includes a display 3, screen 5, cabinet 7, keyboard 9, and mouse 11. Mouse 11 can have one or more buttons for interacting with a GUI. Cabinet 7 houses a CD-ROM drive 13, system memory and a hard drive (see FIG. 2) which can be utilized to store and retrieve software programs incorporating computer code that implements aspects of the invention, data for use with the invention, and the like. Although CD-ROM 15 is shown as an exemplary computer-readable storage medium, other computer-readable storage media including floppy disk, tape, flash memory, system memory, and hard drive can be utilized. Additionally, a data signal embodied in a carrier wave (e.g., in a network including the Internet) can be the computer-readable storage medium.

Figure 2:
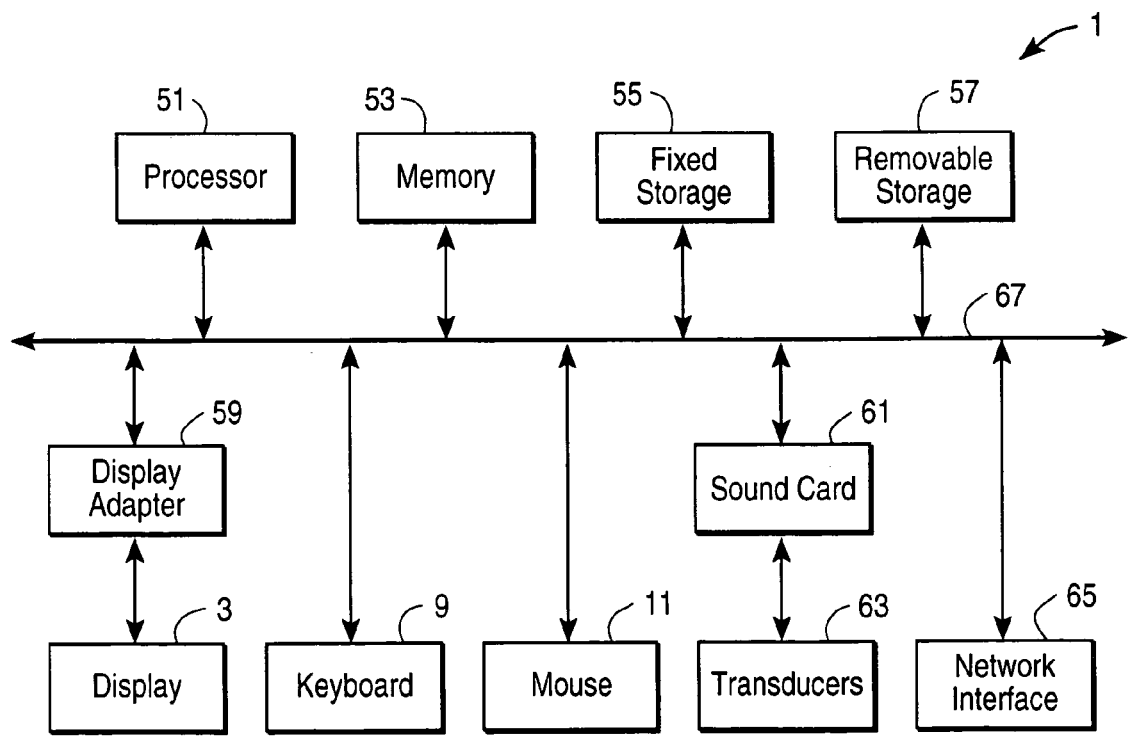
FIG. 2 illustrates a system block diagram of the computer system of FIG. 1.

FIG. 2 shows a system block diagram of computer system 1 used to execute a software of an embodiment of the invention or use hardware embodiments. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, transducers 63 (speakers, microphones, and the like), and network interface 65. Other computer systems suitable for use with the invention can include additional or fewer subsystems. For example, another computer system could include more than one processor 51 (i.e., a multi-processor system) or a cache memory.

The system bus architecture of computer system 1 is represented by arrows 67. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for use with the invention. Other computer architectures having different configurations of subsystems can also be utilized.

Figure 3:
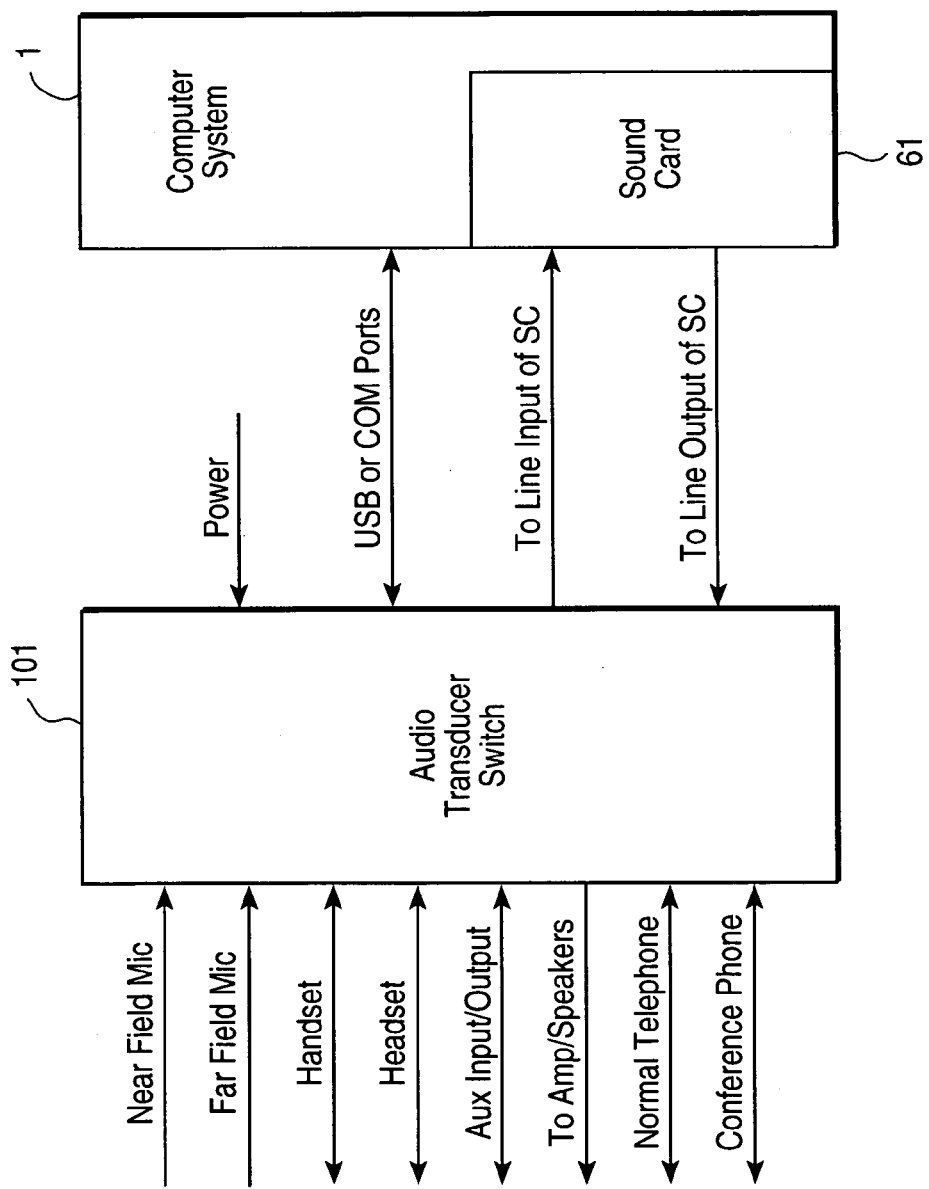
FIG. 3 shows an embodiment of a system that utilizes an audio transducer switch to allow a computer system to access and utilize multiple audio transducers.

FIG. 3 shows a system that utilizes an audio transducer switch to configure and use multiple audio transducers, in accordance with a specific embodiment of the present invention. As shown, computer system 1 includes sound card 61. The input and output ports or channels of sound card 61 are connected to an audio transducer switch 101, which is provided with power, for example, from an external source or power cell. Audio transducer switch 101 is shown connected to multiple audio transducers including a near field microphone, a far field microphone, a handset, a headset, an auxiliary input/output, speakers (or amplifier), a normal telephone (analog phone or digital phone), and a conference telephone. The audio transducer switch can be connected to more or fewer audio transducers but the audio transducers shown represent a reasonable number and variation of audio transducers for illustrating the present invention. Further details on each of these audio transducers will be described below.

According to the specific embodiment, audio transducer switch 101 is an intermediary device between the audio transducers and computer system 1. The audio transducer switch determines which one or ones of the audio transducers will be electrically connected to the input and output ports of sound cards 61. In order to allow user configuration of the audio transducers, computer system 1 can communicate with audio transducer switch 101 through a different port or channel, such as a universal serial bus (USB) or serial COM port.

Figure 4:
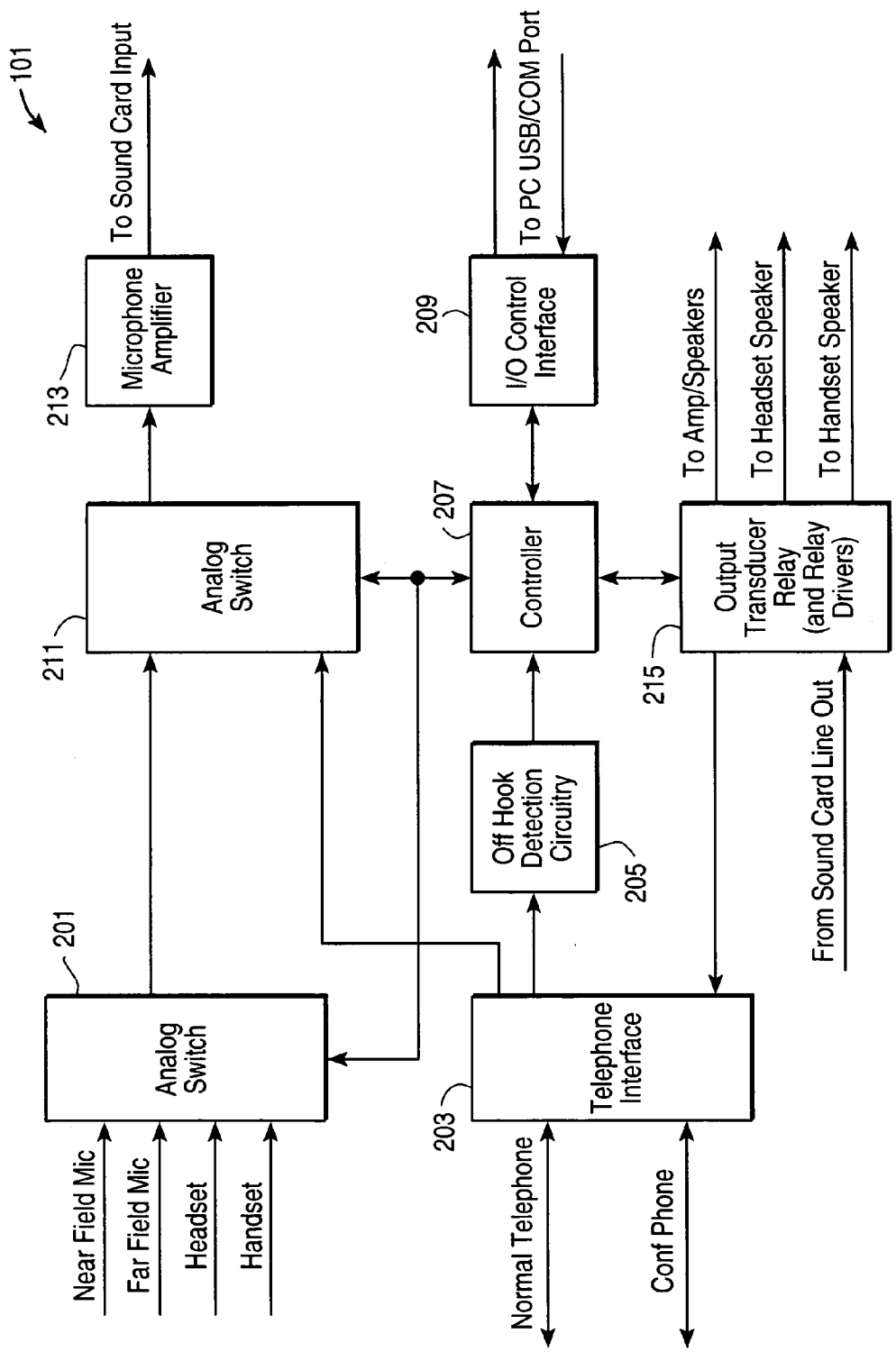
FIG. 4 shows a block diagram of an embodiment of the audio transducer switch of FIG. 3.

Now that a system of the invention has been described at a high level, it may be beneficial to describe in more detail an embodiment of the audio transducer switch. FIG. 4 shows a block diagram of an embodiment of an audio transducer switch, such as the one shown in FIG. 3. Audio transducer switch 101 includes an analog switch 201 that receives audio signals from the near field microphone, the far field microphone, the headset microphone, and the handset microphone. The near field microphone is a microphone that is intended to be placed near the user's mouth when speaking. The far field microphone is useful in group situations as it is designed to pick up sounds from a greater region around the microphone, such as in a conference room setting. A headset is a device that places a speaker in close proximity of a user's ear and a microphone in close proximity to the user's mouth. A handset is similar to a headset except that it is designed to be held in the hand instead of being placed upon the head.

The audio transducers that are connected to analog switch 201 are under programmatic control. In other words, the invention allows the user to programmatically control which of the audio transducers will be utilized. Another type of audio transducer that can be under programmatic control is the auxiliary input/output, which provides standard line levels that are found on a wide variety of devices such as stereo systems.

Audio transducers that are not under programmatic control are telephony devices that have off hook interrupt control. Telephony devices have a reliable signaling channel that indicates if the device is on ("off hook") or off ("on hook"). Two such devices are shown as a normal phone and a conference phone that are connected to a telephone interface 203. These audio transducers are not programmatically controlled, but instead are automatically selected when the device goes off hook. Going off hook is when the handset is raised from a standard telephone or typically when a conference telephone is turned on. Embodiments of the invention utilize this off hook interrupt to override, for the duration of the off hook condition, the configuration that has been selected in the GUI. Programmatic control for these devices may not be necessary since when a user lifts a handset from its cradle or turns on a conference telephone, the user is implicitly requesting that the device be activated and that other inputs and outputs be deactivated. Telephone interface 203 changes the electrical characteristics of the audio signals from the telephony devices to standard levels for processing by analog switch 211. If a digital phone is used, telephone interface 203 would also include appropriate digital/analog interface and proprietary protocol conversion as needed.

Off hook detection circuitry 205 detects when one of the telephony devices connected to telephone interface 203 goes off hook and generates an interrupt to a controller (or microprocessor) 207. Implementations for off hook detection circuitry 205 are known in the art. In other embodiments, the off hook detection functions (and many, if not all, of the other functions shown in FIG. 4) are implemented through software (or firmware) that directs the operation of controller 207. Accordingly, the functional blocks shown in FIG. 4 are for illustration purposes and do not necessarily imply that separate hardware blocks must be utilized.

Controller 207 directs the operation of audio transducer switch 101. The controller receives configuration information and communicates with the computer system or PC through input/output (I/O) control interface 209, which is coupled to a port (e.g., USB port or COM port) of the PC.

In order to set the configuration that has been received from the computer system, controller 207 sends signals to analog switch 201 to select the appropriate audio transducer(s) under programmatic control. When controller 207 receives a signal that one of the telephony devices that are not under programmatic control is off hook, controller 207 can select the off hook telephony device by sending an appropriate signal to an analog switch 211 that receives input from analog switch 201 and telephone interface 203.

Once the appropriate input audio transducer is selected at analog switch 211, the audio signals are transmitted to a microphone amplifier 213 that amplifies the audio signals to the appropriate levels for the sound card input.

Other audio transducers that are under programmatic control include speakers (and possibly an amplifier), a headset speaker, and a handset speaker. These speakers are most commonly utilized as the output audio transducer in conventional computer systems and typically include an amplifier.

Controller 207 sends signals to an output transducer relay 215 to select which of the output audio transducers under programmatic control will receive the signals from the sound card output. Additionally, if controller 207 receives a signal that a telephony device is off hook, the controller can send the appropriate signal to output transducer relay (and relay drivers) 215 to direct the audio signals from the sound card output to telephone interface 203. In this manner, the telephony device that goes off hook will override the output audio transducers under programmatic control.

Figure 5:
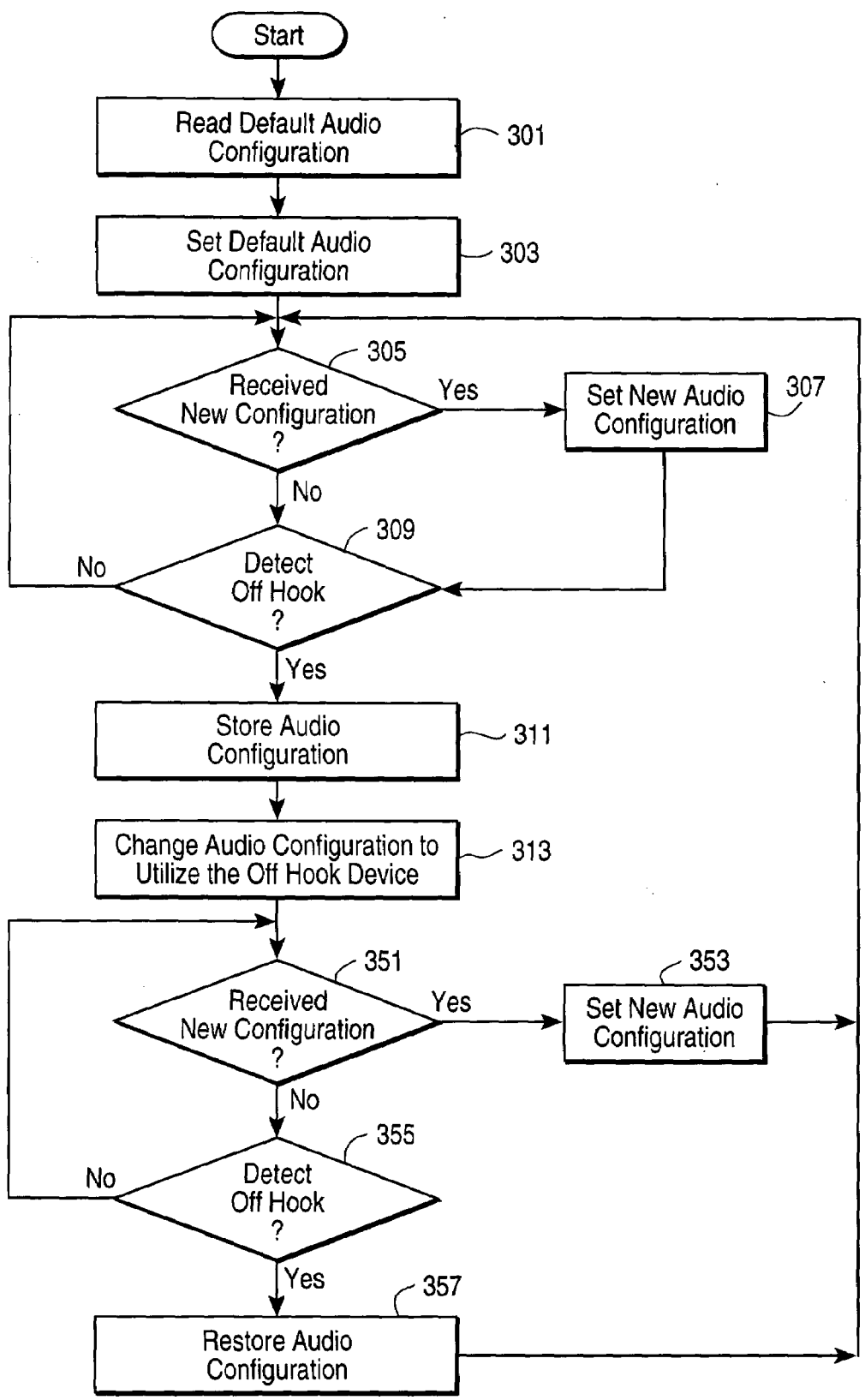
FIG. 5 shows a flow chart of a process of utilizing and configuring multiple audio transducers including audio transducers that have off hook capabilities.

As mentioned above, controller 207 in FIG. 4 can execute software that directs the operation of the audio transducer switch. FIG. 5 shows a flow chart of a process that the controller can execute. At a step 301, the default audio configuration is read or received. During startup, the controller can read the default audio configuration from local memory, or the controller can receive the default audio configuration at startup from the computer system.

Once the controller receives the default audio configuration, the controller sets the audio configuration at a step 303. The audio configuration specifies which of the audio transducers, typically those under programmatic control, should be configured to receive input and/or output.

At a step 305, the controller determines whether it has received a new configuration. If a new configuration has been received, the controller sets the new audio configuration at a step 307. Otherwise, the controller determines if an off hook condition for a telephony device has been detected at a step 309. If an off hook condition has been detected, the controller stores the current audio configuration at a step 311. By storing the current audio configuration, the controller can restore this audio configuration once the telephony device goes on hook. The controller changes the audio configuration to utilize the off hook device at a step 313.

If an off hook condition was not detected at step 309, the controller returns to step 305 to determine if a new configuration was received. As should be apparent, steps 305 and 309 graphically represent a polling technique of continually checking for a new configuration or an off hook condition. Polling techniques are inherently easier to depict graphically in flow charts; however, in preferred embodiments, interrupts are utilized to signal new configurations or off hook conditions. Accordingly, the invention should not be limited by the embodiments shown in the drawings. For example, steps in the flow charts can be added, deleted, reordered, and combined without departing from the spirit and scope of the invention.

Once the controller has changed the audio configuration to utilize an off hook telephony device, the controller at a step 351 determines if it has received a new audio configuration. If a new audio configuration has been received, the controller sets the new audio configuration at a step 353. By setting a new audio configuration, the user is able to override the off hook telephony device if desired. If the off hook telephony device is overridden, the execution flow of the controller returns to step 305. Of course, if the user changes the audio configuration but does not override both the input and output of the off hook telephony device, the controller should set the new audio configuration but proceed to a step 355 to detect an on hook condition.

In preferred embodiments, a user is not permitted to override the use of an off hook telephony device. Accordingly, steps 351 and 353 are optional or they may be utilized to change the audio configuration that will be restored once the telephony device goes on hook. This implementation assumes that a user will want to use an off hook device as long as it is off hook and the user will need to hang up the device (put it on hook) in order to choose another device.

At step 355, the controller determines if an on hook condition has been detected for the telephony device. If an on hook condition has been detected for the telephony device, the controller restores the audio configuration at a step 357. In other words, the telephony device that was off hook to override the audio configuration has been hung up and the audio configuration should be restored to its original state before the telephony device was taken off hook.

The preceding paragraphs have been described in reference to an embodiment of an audio transducer switch to be used in conjunction with an internal sound card. Although currently internal sound cards are the most prevalent, it is possible that in the future external sound cards will become increasingly more popular. An external soundcard is simply a device that is connected to a PC through a port or channel instead of being within the computer system chassis installed directly on the bus.

External sound cards provide numerous advantages over conventional internal sound cards. For example, the environment within a computer system chassis can have a fair amount of electrical interference. By moving the sound card outside the computer system chassis, the sound card circuitry can be better shielded from electronic interference. Additionally, the real estate for slots for internal cards is limited within the PC. By utilizing an external sound card, the real estate for slots is not reduced.

Figure 6:
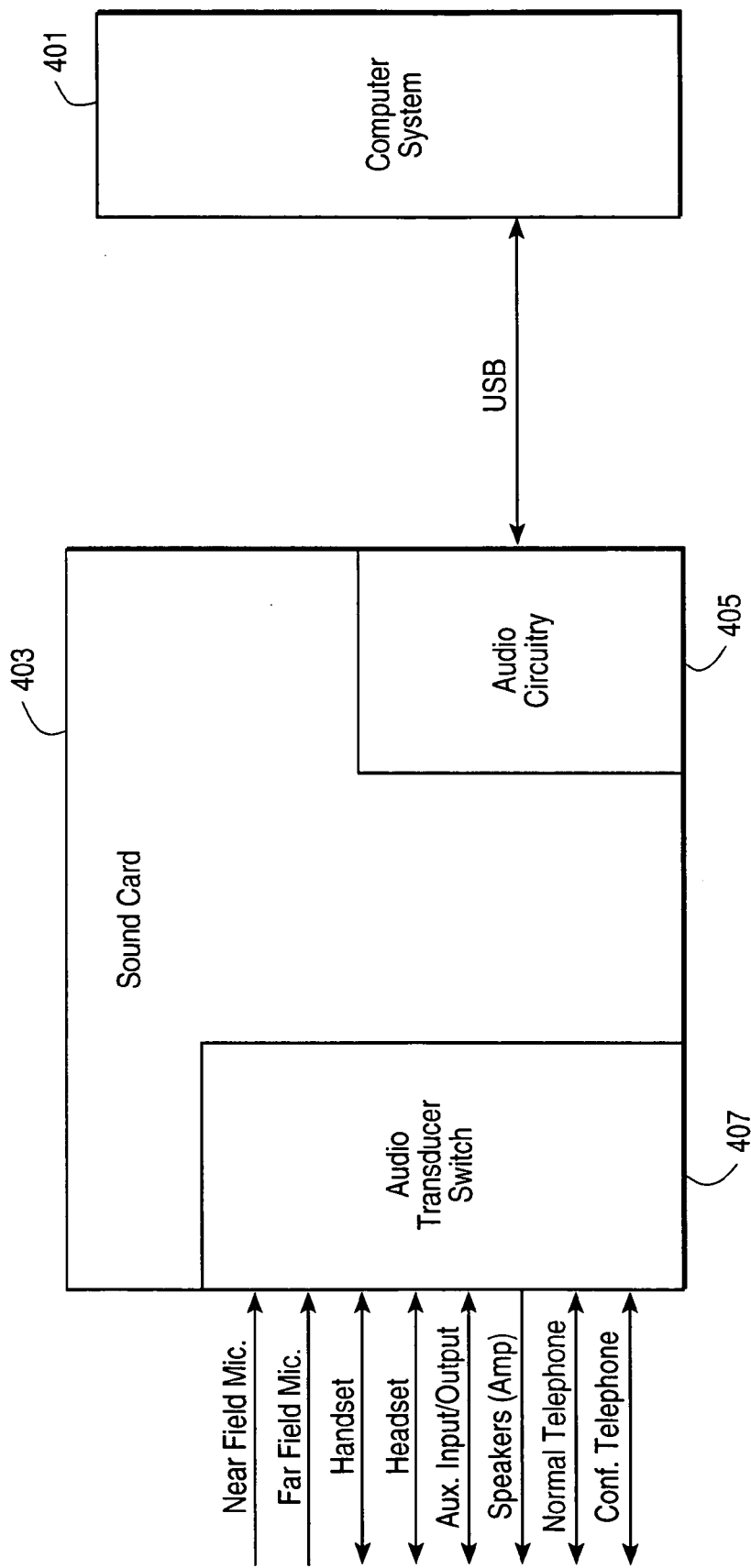
FIG. 6 shows a system that includes an external sound card incorporating an audio transducer switch of the present invention.

FIG. 6 shows an embodiment of an audio transducer switch on an external sound card. A computer system 401 communicates with an external sound card 403 through a channel such as a USB.

As shown, sound card 403 includes audio circuitry 405 and an audio transducer switch 407. Audio circuitry 405 is generally responsible for converting analog audio signals to digital audio signals that are transmitted to computer system 401, and vice versa.

Audio transducer switch 407 is electrically coupled between audio circuitry 405 and the multiple audio transducers that are shown. The operation of audio transducer switch 407 can be similar to that which was described in reference to FIG. 5. Although FIG. 6 shows an external sound card embodiment, the invention can also be applied to internal sound cards in a similar fashion.

Figure 7:
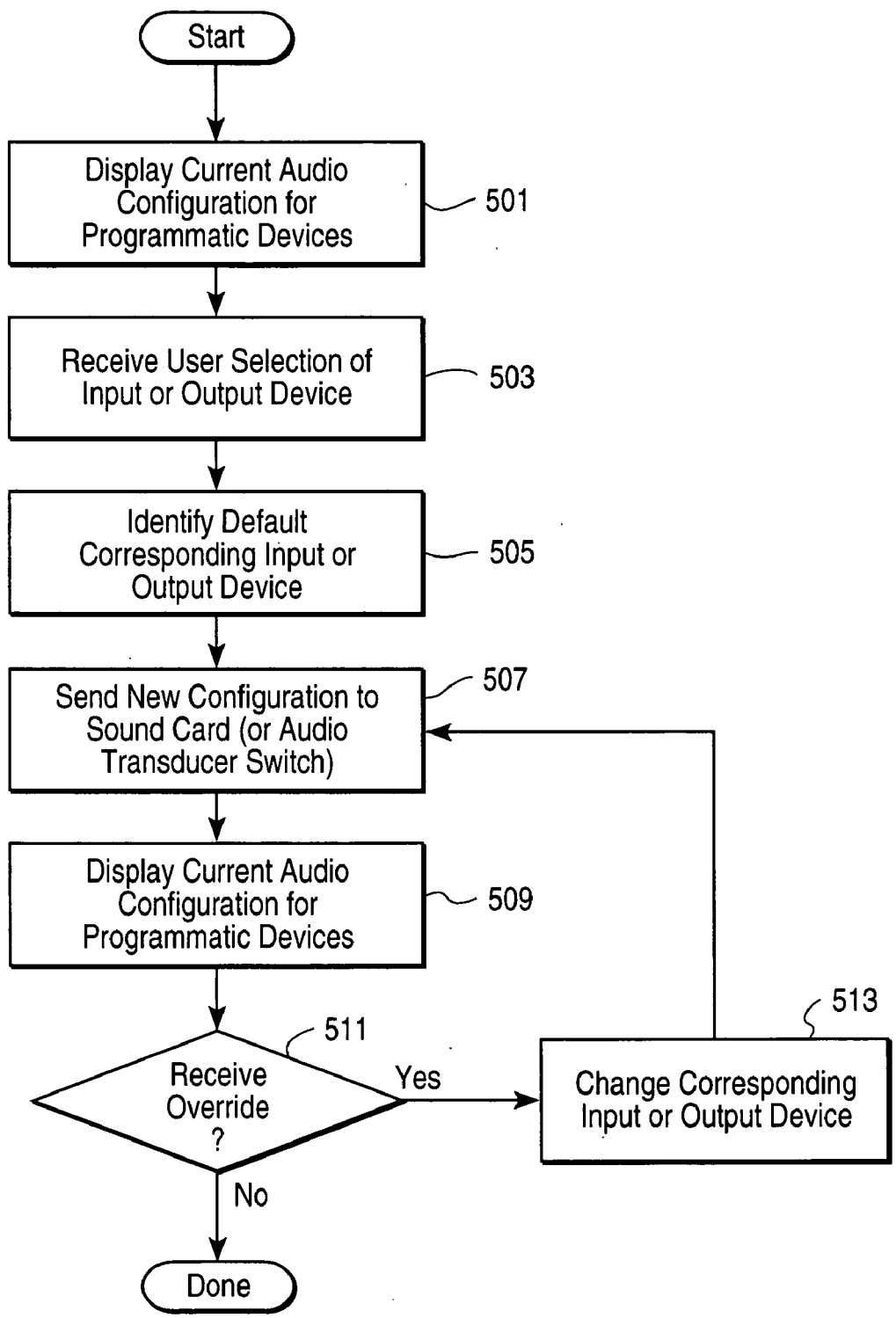
FIG. 7 shows a flow chart of the process of providing a graphical user interface (GUI) to configured the utilization of multiple audio transducers in a computer system.

As generally described above, the audio transducer switch can receive audio configuration information from the computer system. FIG. 7 shows a flow chart of a process of receiving audio configuration information from a user that is utilizing a GUI, in accordance with a specific embodiment of the invention. At a step 501, the computer displays the current audio configuration for the programmatic devices. Examples of GUI windows will be described in more detail in reference to FIGS. 8A–8C. The computer system receives a user selection of an input or output device at a step 503. The user can select the input or output device utilizing a pointing device (such as a mouse) for the GUI. At a step 505, the computer system identifies a corresponding default input or output device. For example, if a user selects the headset microphone, the default output audio transducer should probably be the headset speaker and the computer system could automatically select the headset speaker (see, e.g., FIG. 8B). Of course, if there is no corresponding default input or output device, the computer system can leave the corresponding input or output device unchanged (i.e., utilize the current input or output device).

At a step 507, the computer system sends the new configuration to the sound card (incorporating the audio transducer switch, in accordance with one specific embodiment) or to the audio transducer switch in accordance with another specific embodiment. Once the new audio configuration is received, the sound card or audio transducer switch should set the new audio configuration as described above.

The current audio configuration for programmatic devices is displayed at a step 509. The user can review the current audio configuration and decide whether it is desired. If the user determines that it is not desired, the user can override the audio configuration by selecting a different programmatic device. If the computer system receives an override at a step 511, the corresponding input or output device is changed at a step 513. By allowing the user to override the audio configuration, the audio configuration is not limited solely to the default configurations that have been established either by the system or by the user.

Once the audio configuration has been changed, the new configuration is sent to the sound card or audio transducer switch at step 507. The flow chart of FIG. 7 shows a process of utilizing a GUI to change the audio configuration for audio transducers under programmatic control. In order to better illustrate an exemplary process, examples of GUI windows are shown in FIGS. 8A–8C.

Figure 8A:
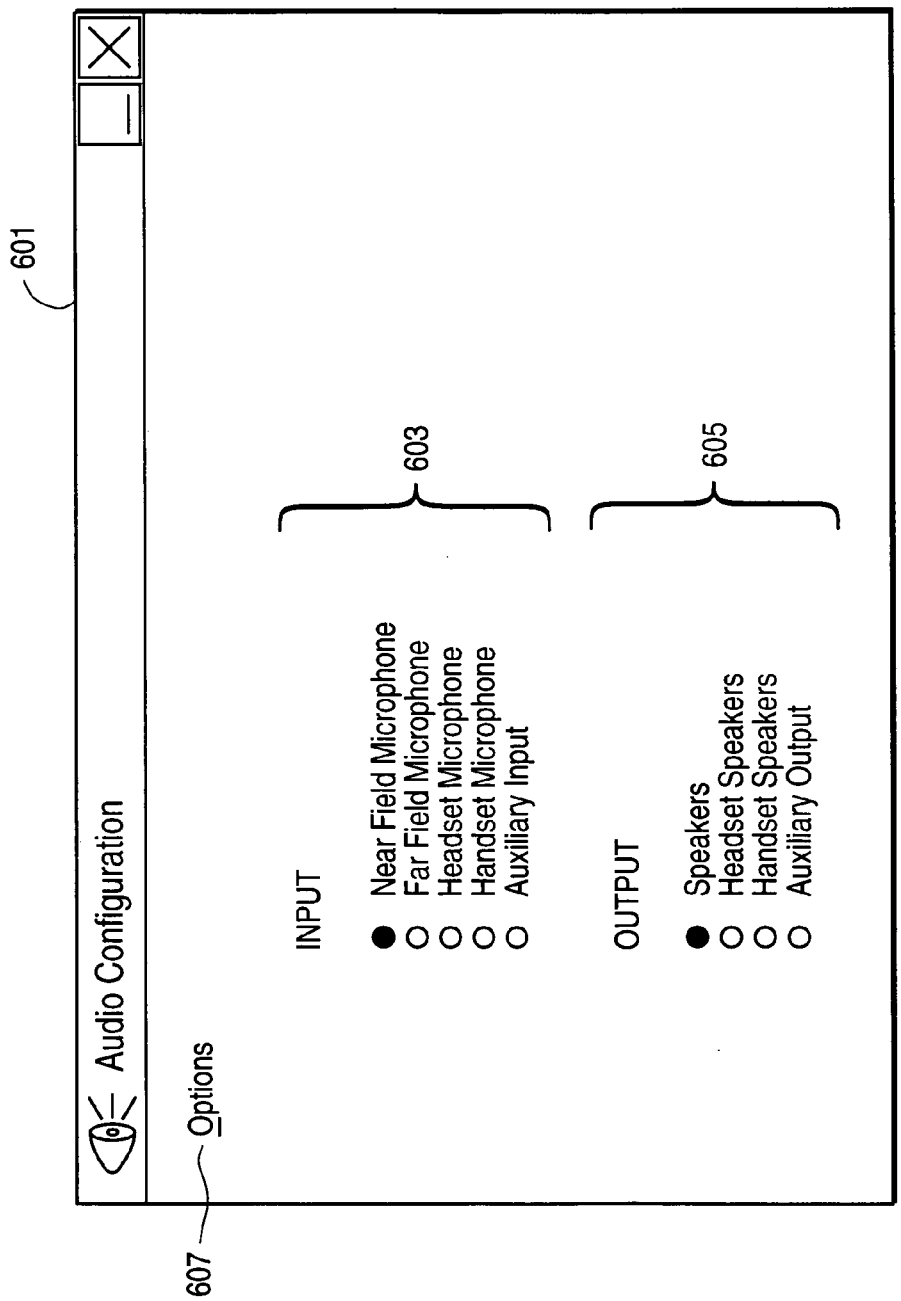
FIGS. 8A–8C show examples of GUI windows that allow a user to select the configuration of multiple audio transducers.
Figure 8B:
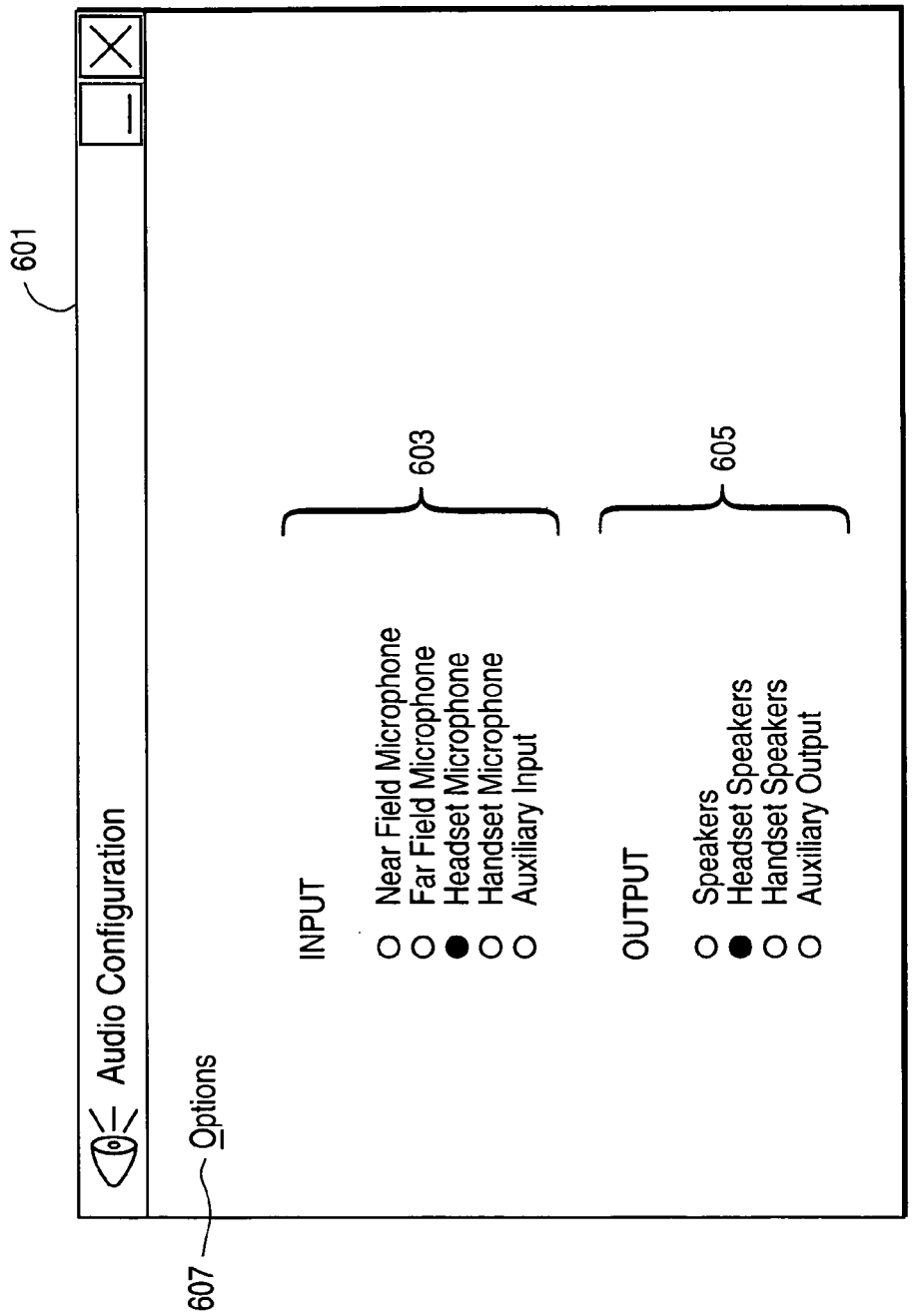
Figure 8C:
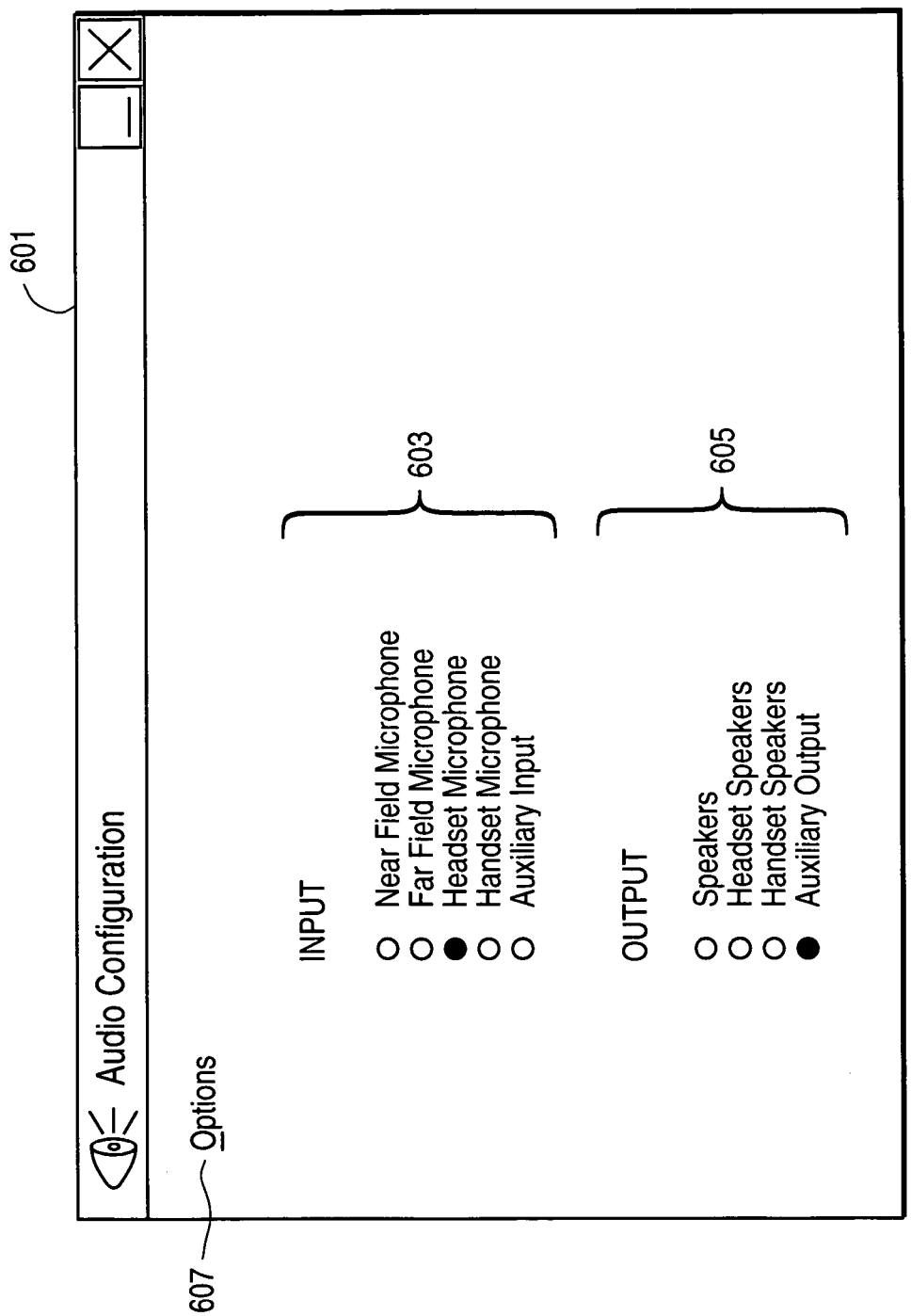

In FIG. 8A, a GUI window 601 is shown. Window 601 includes an input section 603 and an output section 605. Each section includes "radio" GUI objects that allow a user to select one input or output device from the displayed choices to be used in the current audio configuration. Therefore, the radio GUI objects can be utilized by the user to override default audio configurations.

As shown in FIG. 8A, the current configuration is for the near field microphone as the input audio transducer and the speakers as the output audio transducer. A pull down menu 607 can be utilized to set the default audio transducers and defaults for corresponding input and output devices.

Assume that the user has viewed the configuration shown in FIG. 8A and determines that they would like to utilize the headset. Once the user selects the headset microphone as shown in FIG. 8B, the computer system can determine if there is a corresponding output audio transducer for the headset microphone. As described above, typically the default output device for the headset microphone is the headset speakers. Accordingly, the headset speakers can be automatically selected as the output transducer for the user as shown in FIG. 8B.

If the user feels that the headset speakers are the desired output audio transducer, the user need take no action. However, if the user instead prefers a different output audio transducer, such as the auxiliary output, the user can select the appropriate GUI object to specify the auxiliary output as shown in FIG. 8C. This new configuration would then be sent to the sound card or audio transducer switch.

While the above is a complete description of various specific embodiments of the invention, other specific embodiments can be used. For example, the specific embodiments have been discussed in the context of computer telephony; however, other embodiments of the present invention could be useful in other applications such as voice recognition, audio playback of email or pager messages, and apply more generally to interactions with various types of audio servers. Therefore, the above description should not be taken as limiting the scope of the invention that is defined by the metes and bounds of the following claims along with their full scope of equivalents.

What is claimed is:

1. A method of managing audio transducers, comprising:
   receiving a configuration for a plurality of audio transducers, said configuration specifying that audio signals are to be sent to a first audio transducer and received from a second audio transducer;
   detecting if a third audio transducer has been turned on;
   storing the configuration for the plurality of transducers if it is detected that the third audio transducer has been turned on, said stored configuration specifying that audio signals are to be sent to a first audio transducer and received from a second audio transducer;
   changing the configuration such that audio signals are sent to the third audio transducer instead of the first audio transducer if it is detected that the third audio transducer has been turned on;
   changing the configuration such that audio signals are received from the third audio transducer instead of the second audio transducer if it is detected that the third audio transducer has been turned on; and
   determining whether a new configuration is received if it is not detected that the third audio transducer has been turned on.

2. The method of claim 1, further comprising:
   detecting if the third audio transducer has been turned off; and
   restoring the configuration to said stored configuration such that audio signals are sent to the first audio transducer instead of the third audio transducer if it is detected that the third audio transducer has been turned off.

3. The method of claim 1, further comprising setting the configuration in an audio device between the plurality of audio transducers and a computer system, wherein said configuration is received from the computer system.

4. The method of claim 3, wherein the configuration is input by a user utilizing a graphical user interface (GUI).

5. The method of claim 4, further comprising:
   allowing a user to select one of an input or output audio transducer; and
   automatically selecting a default corresponding input or output audio transducer according to the user's selection.

6. The method of claim 1, wherein the third audio transducer is a telephony device and is turned on by going off hook.

7. The method of claim 1, further comprising setting the configuration in an audio device coupled to the plurality of audio transducers, said audio device being a sound card.

* * * * *